United States Patent [19]

Sisson et al.

[11] 4,302,977
[45] Dec. 1, 1981

[54] VIBRATION SEVERITY INDICATOR

[75] Inventors: Edwin D. Sisson, Worthington; Carl J. Spehr, Gahanna, both of Ohio

[73] Assignee: IRD Mechanalysis, Inc., Columbus, Ohio

[21] Appl. No.: 137,552

[22] Filed: Apr. 4, 1980

[51] Int. Cl.³ .............................................. G01N 29/00
[52] U.S. Cl. ........................................ 73/658; 73/660
[58] Field of Search ................ 73/660, 658, 659, 661, 73/593, 646, 647; 340/683

[56] References Cited

U.S. PATENT DOCUMENTS 3,201,776  8/1965  Morrow et al. ...................... 73/660

FOREIGN PATENT DOCUMENTS 751634  1/1967  Canada .................................. 73/660
1349408  4/1974  United Kingdom .................. 73/647

Primary Examiner—Stephen A. Kreitman
Attorney, Agent, or Firm—Mueller and Smith

[57] ABSTRACT

A vibration severity indicator has been developed which permits an operator to determine the severity of instantaneous vibration of a vibrating body in accordance with a vibration scale which is appropriate to the vibrating body. A DC ammeter is provided with a single scale divided into uniform segments. A selection switch is provided to permit the operator to indicate the category of the vibrating object so that the single meter scale will accurately reflect standards applicable to the category of the vibrating object. The result is accomplished by delivering an electrical signal corresponding to the instantaneous vibration level through a chain of resistance separated by contacts corresponding to the switch positions.

3 Claims, 2 Drawing Figures

VIBRATION SEVERITY INDICATOR

BACKGROUND OF THE INVENTION

1. Field of the Invention

This invention relates to a vibration severity indicator which provides a visual indication of the instantaneous mechanical vibration level of a vibrating object.

2. Description of the Prior Art

Numerous devices are available for determining the instantaneous vibration level of vibrating objects. See U.S. Pat. No. 3,098,379. These systems usually include a vibration detector adapted to generate an electrical signal corresponding to the instantaneous displacement, velocity or acceleration of the vibrating object and means for measuring the amplitude of the resulting electrical signal. Seismic detectors generate an electrical signal having a voltage which corresponds to the instantaneous velocity of the vibrating object. Proximity detectors and accelerometers can be employed to observe the instantaneous displacement and acceleration, respectively, of the vibrating object.

There is a need for a vibration severity indicator which can be used by relatively inexperienced operators for inspection of a variety of rotating machinery, for example, on a large ship, many different sized motors will be found which should be periodically inspected in a preventive maintenance program.

The International Standards Organization has established six different classes of machines as follows:

Class I: Individual parts of engines and machines, integrally connected with the complete machine in its normal operating condition. Production electric motors up to 15 kilowatts are typical examples of machinery in this class.

Class II: Medium-sized machines, typically electrical motors with 15-75 kilowatt output, without special foundations; rigidly mounted engines or machines, up to 300 kilowatts, on special foundations.

Class III: Large prime movers and other large machines with rotating masses mounted on rigid and heavy foundations which are relatively stiff in the direction of vibration movement.

Class IV: Large prime movers and other large machines with rotating masses mounted on foundations which are relatively soft in the direction of vibration measurement, for example, turbogenerator sets, especially those with lightweight substructures.

Class V: Machines and mechanical drive systems with unbalanceable inertia forces, due to reciprocating parts, mounted on foundations which are relatively stiff in the direction of vibration measurement.

Class VI: Machines and mechanical drive systems with unbalanceable inertia forces, due to reciprocating parts, mounted on foundations which are relatively soft in the direction of vibration measurements; machines with rotating slack coupled masses such as beater shafts in grinding mills, machines, like centrifugal machines, with varying unbalances capable of operating as self-contained units without connecting components; vibrating screens, dynamic fatigue testing machines and vibration exciters used in processing plants.

Of these six classifications, the first four classes lend themselves to vibration analysis and correction. With respect to Class I, Class II, Class III, Class IV machinery, it is possible to establish ranges of vibration severity based upon the observed vibration, measured in velocity decibels.

Note: Velocity decibels are defined as:

$$\text{Velocity Decibels} = 20 \log \frac{\text{Velocity (cm/sec RMS)}}{10^{-6} \text{ (cm/sec RMS)}}$$

The following Table 1 shows that Class I machinery vibration may range from 0.28 to 11.2 millimeters per second RMS; for Class II machinery from 0.45 to 18 millimeters per second RMS; for Class III machinery, 0.71 to 28 millimeters per second RMS; for Class IV machinery from 1.12 to 45 millimeters per second RMS. These accepted ranges, when expressed in decibels, encompass 32 decibels. Each of the ranges can be conveniently divided into four segments, each segment having a constant decibel span of 8 decibels as shown in Table 1.

TABLE 1

| VIBRATION VELOCITY | | QUALITY JUDGEMENT | | | |
|---|---|---|---|---|---|
| mm/sec RMS | Decibels | Class I | Class II | Class III | Class IV |
| 0.28 | 89 | — | | | |
| 0.45 | 93 | A | — | | |
| 0.71 | 97 | — | A | — | |
| 1.12 | 101 | B | — | A | — |
| 1.8 | 105 | — | B | — | A |
| 2.8 | 109 | C | — | B | — |
| 4.5 | 113 | — | C | — | B |
| 7.1 | 117 | D | — | C | — |
| 11.2 | 121 | — | D | — | C |
| 18 | 125 | | — | D | — |
| 28 | 129 | | | — | D |
| 45 | 133 | | | | — |

SUMMARY OF THE INVENTION

The present invention provides a vibration severity indicator which will indicate for each item of machinery the observed vibration level within the allowable vibration range for that class of machinery. The operator sets the indicator for the particular class of the machinery under inspection and observes the instantaneous vibration level. The indicator provides the operator with an indication of the segment of the allowable vibration range for that particular equipment.

In a preferred embodiment, the indicator has four separate ranges which are calibrated to the ISO standards wherein the full-scale deflection of the meter covers a constant decibel range of vibration—which range is different for each switch position. By selecting a decibel range for full-scale reading which is appropriate for the object under investigation, the visible scale on the instrument can be segmented, for example, into four uniform segments which will be applicable to each of the ranges controlled by the selection switch.

DESCRIPTION OF THE PREFERRED EMBODIMENT(S)

Figure 1:
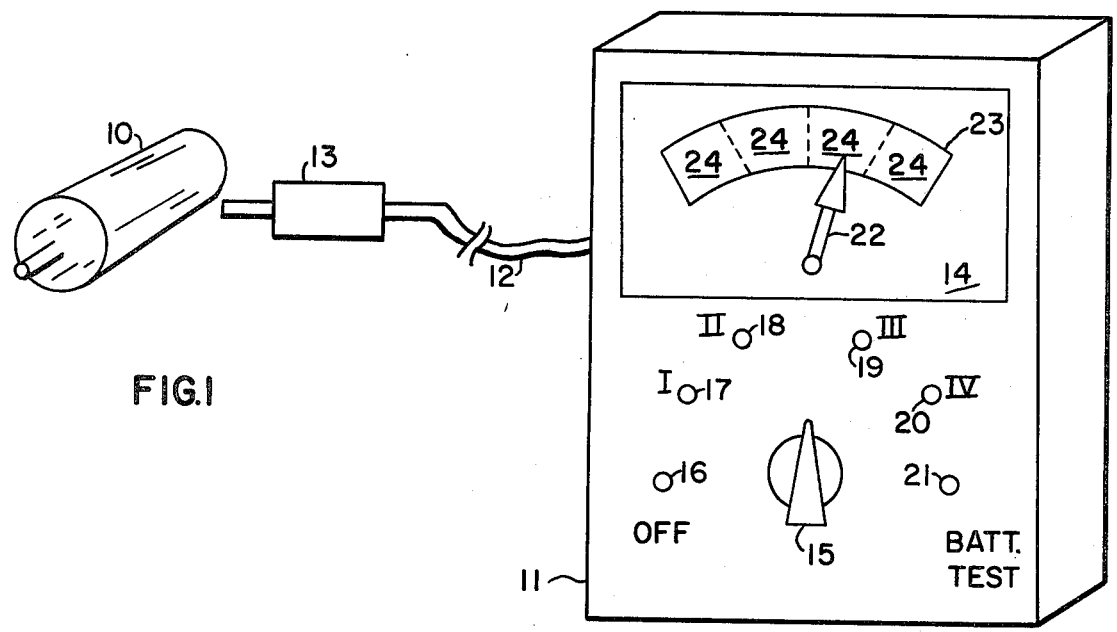
FIG. 1 is a perspective illustration of the vibration severity indicator of this invention.

As shown in FIG. 1, a rotor 10 will manifest mechanical vibrations in operation. These vibrations can be detected and evaluated with the present apparatus which includes a vibration severity indicator 11 connected by a suitable conductor means 12 to a vibration detector 13 which is an electromagnetic transducer adapted to generate an electrical signal corresponding to the instantaneous mechanical vibrations of the rotor 10. The vibration signals are delivered through the conductor 12 to the vibration severity indicator 11 which includes a meter 14, a multiposition switch 15 having six switch positions as shown in FIG. 1 including an off position 16; positions 17, 18, 19, 20 which correspond to different classes of mechanical equipment whose vibration is to be measured; and a position 21 which provides for a battery test to assure the operator that the device is operable. A companion switch section 15A also is employed in the battery test function. It will be observed that the meter 14 includes an indicator needle 22 and a meter-scale array 23 which is divided into equal length segments 24, each of which may have its own individual color or each of which may be distinguished by an appropriate legend, e.g., A, B, C, D.

In practice, the operator carries the vibration severity indicator 11, the conductor 12 and the vibration detector 13 to a particular vibration source under investigation and determines initially the proper classification of the vibration source to be inspected. Categorizing each vibration source normally occurs upon installation of the source. The appropriate category is indicated on a nameplate or similar placard related to the particular source. The operator then sets the switch 15 to the correct class. Thereafter the vibration detector 13 is employed in its normal fashion (according to whether it is a proximity detector or a seismic detector or accelerometer, for example). The resulting vibrations are converted into a corresponding electrical signal which is delivered through the conductor 12 and causes the meter needle 22 to indicate the instantaneous vibration severity for the selected classification as determined by the switch 15.

Figure 2:
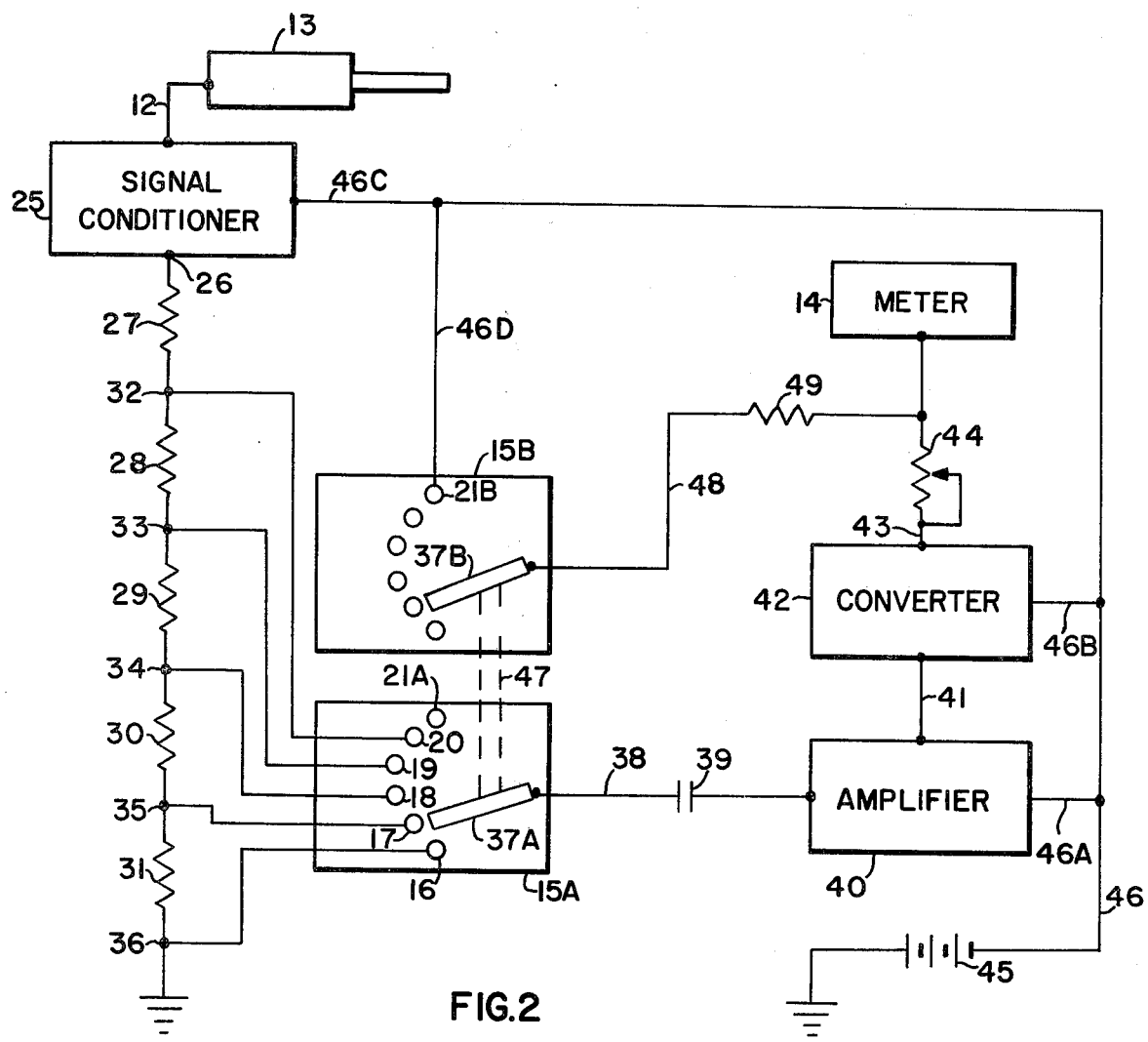
FIG. 2 is a schematic electrical diagram of the circuitry included within the present vibration severity indicator.

The circuitry which is employed in the vibration severity indicator is illustrated in FIG. 2 wherein the vibration detector 13 delivers its electrical signal through the conductor 12 to a signal conditioner 25 which may be within the housing of the vibration severity indicator 11. The signal conditioner serves to convert the electrical signal from the transducer 13 to a velocity signal if necessary. Where the vibration detector 13 is an accelerometer which measures the instantaneous acceleration of the mechanical vibrations, the signal conditioner 25 integrates the accelerometer signal to produce an output signal at the terminal 26 which corresponds to the instantaneous velocity of the mechanical vibration. The resulting signal is delivered from the output terminal 26 through a chain of resistors 27, 28, 29, 30, 31 which comprise a range attenuator. A terminal 32, 33, 34, 35 is provided between each pair of adjoining resistors. A ground terminal 36 also is provided at the end of the chain of resistors.

The switch 15 has a first deck 15a having terminals 16, 17, 18, 19, 20, 21a and wiper arm 37a and a second deck 15b having terminal 21b and wiper arm 37b. The wiper arms 37a, 37b are mechanically ganged as indicated by the broken lines 47. When the wiper arm 37a is connected to the terminal 17, 18, 19 or 20, the vibration signal from the transducer 13 is delivered through the wiper arm 37a and thence through a conductor 38, a coupling capacitor 39 to an amplifier 40 which increases the voltage of the vibration signal without altering its frequency or waveform. The amplified signal from the amplifier 40 is delivered through a conductor 41 to a converter 42 which converts the signal to a direct current voltage which is delivered through a conductor 43 and a rheostat 44 to the meter 14 which is a direct current milliammeter having a range from 0 current to full-scale current. A rheostat 44 provides an adjustment of the circuitry to achieve full-scale meter calibration. A battery 45 is provided to power the amplifier 40, converter 42 and signal conditioner 25 through conductors 46, 46a, 46b, 46c. The battery 45 also is connected to the switch terminal 21b through conductors 46, 46d.

Battery Test

When the switch 15 is in the battery test position 21 and the wiper arm 37b contacts the terminal 21b, the battery 45 supplies its voltage through conductors 46, 46d, terminal 21b, wiper arm 37b, conductor 48, resistor 49 to the meter 14.

In a typical installation, the values of the resistances are as set forth in the following table:
Resistor 27: 84 Kohms
Resistor 28: 5.9 Kohms
Resistor 29: 3.72 Kohms
Resistor 30: 2.35 Kohms
Resistor 31: 4.02 Kohms The signal generated by the converter 42 is the logarithm of the RMS content of the signal in the conductor 41. Thus the signal appearing at the meter 14 is the decibel equivalent of the vibration signal generated by the rotor 10.

A preferred converter 42 is an integrated circuit AD536J (Analog Devices, Inc.).

When the switch 15 is in the off position 16, the wiper arm 37a engages the contact 16, the system is grounded and the meter 14 will read zero scale. When the switch 15 is in the battery test position 21, the meter 14 will provide a full-scale indication if the battery 45 has its full voltage.

By appropriate color coding of the segments 24 of the common scale of the meter 14 (e.g., white, green, amber, red) or by appropriate legends attached to the segments 24 (e.g., A, B, C, D or GOOD, SATISFACTORY, DOUBTFUL, UNSATISFACTORY), a relatively unskilled operator can diagnose the qualitative state of several different known classes of vibration sources, such as motors. The appropriate classification for each motor should be affixed to a label on the motor so that the operator can select the corresponding switch position for the selector switch 15.

In the preferred embodiment, the full-scale range of the meter 14 is 32 decibels and scale is divided into four segments, each having a range of 8 decibels.

We claim:

1. A vibration severity indicator for displaying transducer derived vibration levels of machines having predetermined machine classifications comprising:
conductor means connectable with said transducer for receiving electrical signals therefrom related to an instantaneous vibration amplitude of a said machine;
a plurality of serially connected resistors for receiving said signals including contacts for effecting select electrical connections between adjacent ones of said resistors;
means for conveying said signals to said plurality of resistors;

switch means manually actuable for electrical communication with selected ones of said contacts and having visible indicia associated with each said contact corresponding with a unique said machine classification;

amplifier means coupled with said switch means for amplifying the signal derived from a selected said contact;

converter means coupled with said amplifier means for deriving an output signal corresponding with the logarithm of the RMS value of said amplified signal;

a direct current meter responsive to said output signal for providing a readout indicating the instantaneous direct current value of said converter means output signal on a basis from zero to full scale, said meter having a common scale with indicia comprised of segments of predetermined width extending in mutual adjacency substantially from the zero to full scale of said meter, each said segment having a visual indication associated therewith representative of a qualitative evaluation of said vibration levels;

said resistors having resistance values selected to provide said zero to full scale basis in correspondence with a fixed range of vibration levels expressed in decibels.

2. The vibration severity indicator of claim 1 wherein the said common scale is divided into four segments, each segment having a range of 8 decibels.

3. The vibration severity indicator of claim 1 in which said means for conveying said signals to said plurality of resistors provides said signals as vibration velocity signals.

* * * * *